(12) United States Patent
Vineyard

(10) Patent No.: US 10,939,691 B2
(45) Date of Patent: Mar. 9, 2021

(54) EQUINE FEED PRODUCTS AND SYSTEMS AND METHODS OF FEEDING SAME

(71) Applicant: PURINA ANIMAL NUTRITION LLC, Shoreview, MN (US)

(72) Inventor: Kelly Vineyard, Gray Summit, MO (US)

(73) Assignee: PURINA ANIMAL NUTRITION LLC, Arden Hills, MN (US)

( * ) Notice: Subject to any disclaimer, the term of this patent is extended or adjusted under 35 U.S.C. 154(b) by 746 days.

(21) Appl. No.: 14/512,042

(22) Filed: Oct. 10, 2014

(65) Prior Publication Data

US 2016/0100610 A1    Apr. 14, 2016

(51) Int. Cl.
| | | |
|---|---|---|
| *A23K 10/18* | (2016.01) | |
| *A23K 10/12* | (2016.01) | |
| *A23K 10/37* | (2016.01) | |
| *A23K 10/30* | (2016.01) | |
| *A23K 50/20* | (2016.01) | |

(52) U.S. Cl.
CPC .............. *A23K 10/12* (2016.05); *A23K 10/30* (2016.05); *A23K 10/37* (2016.05); *A23K 50/20* (2016.05); *A23V 2002/00* (2013.01); *Y02P 60/87* (2015.11)

(58) Field of Classification Search
CPC ......... A23K 10/12; A23K 10/10; A23K 10/18
USPC ............................................................ 426/2
See application file for complete search history.

(56) References Cited

U.S. PATENT DOCUMENTS

| | | | | | |
|---|---|---|---|---|---|
| 4,582,708 | A | * | 4/1986 | Tipton ................... | A23K 10/18 426/62 |
| 5,908,634 | A | * | 6/1999 | Kemp ..................... | A23K 40/10 424/442 |
| 8,956,590 | B2 | * | 2/2015 | Altman ................... | A61K 36/064 424/9.1 |
| 2005/0042335 | A1 | * | 2/2005 | Stock ....................... | B65D 1/36 426/106 |
| 2009/0227535 | A1 | * | 9/2009 | Courie, Jr. ............ | A61K 31/715 514/54 |

OTHER PUBLICATIONS

Winkler, B. et al. Livestock Sci. 137: 168-177 (2011).*
Leonardo, T. M. et al. J. Animal Sci. 40: 1086-1090 (1975) (Year: 1975).*
Shurson, J. Effect of feeding DDGS to companion animals. pp. 1-4 (Year: 1995).*
Gao et al. Poultry Sci. 88: 2141-2151 (2009) (Year: 2009).*
"Equine PD914—Product Profile," Diamond V, Brochure (1 page).
"Feed Terms and Ingredient Definitions," Association of American Feed Control Officials, 2012, pp. 372-373, 449-450 (6 pages).
Linn et al., "Using Distillers Grains in Dairy Cattle Rations", downloaded from https://www.biofuelscoproducts.umn.edu/sites/biodieselfeeds.cfans.umn.edu/files/cfans_asset_416593.pdf, on Jun. 11, 2018, 11 pages.
Kaiser, Pete, "Advances in avian immunology-prospects for disease control: a review", Avian Pathology; 39(5), Oct. 2010, pp. 309-324.
Dinarello, Charles A., "Historical Review of Cytokines", Eur J Immunol. 37(Suppl 1): S34-S45. doi:10.1002/eji.200737772., Nov. 2007.

\* cited by examiner

*Primary Examiner* — Hamid R Badr
(74) *Attorney, Agent, or Firm* — Dorsey & Whitney LLP

(57) ABSTRACT

Feeding equine animals involves obtaining an equine feed combined with a yeast fermentation product such as a *Saccharomyces cerevisiae* fermentation product, and feeding the feed to the equine animal such that ingestion causes the equine animal to improve performance, including a mitigated inflammatory response or an increased immune in function. The feed may contain about 0.1 to 1.0 percent of the yeast fermentation product by weight of the feed. A formulated feed ration for the equine animal may include grain- and forage-based feed and a *Saccharomyces cerevisiae* fermentation product in an amount of about 5 grams to about 40 grams per head per day.

13 Claims, 10 Drawing Sheets

EQUINE FEED PRODUCTS AND SYSTEMS AND METHODS OF FEEDING SAME

TECHNICAL FIELD

The present disclosure relates to equine feed products, and feeding systems and methods using these products; and more particularly, relates to feeds containing yeast fermentation products and feeding systems and methods using these products for improving animal performance.

BACKGROUND

Specialized equine animal feed and diet formulations are typically provided to equine animals in various settings. The feed may be targeted for the animal's stage of growth and/or activity level. Although several additives and supplements are available for supplementing the equine animal's diet, marketing has out-distanced science resulting in a product-rich equine feed market with little or no demonstration of the effectiveness of these products. Consequently, horse owners and nutritionists are challenged with the uncertainty of whether their equine animal feeding products and systems will result in beneficial results to the animal.

SUMMARY

The present disclosure provides equine animal feeds and feeding systems and methods using these feed for improving animal performance.

According to one implementation, a method of feeding an equine animal involves obtaining a formula feed combined with a *Saccharomyces cerevisiae* fermentation product, the formula feed including one or more of wheat products, soy products, alfalfa products, corn products or rice products; and feeding the formula feed combined with the *Saccharomyces cerevisiae* fermentation product to the equine animal. By ingestion of the formula feed and the *Saccharomyces cerevisiae* fermentation product the equine animal improves performance. In additional configurations and embodiments, the step of feeding the formula feed involves feeding forage to the equine animal, which may be fed ad libitum, may be incorporated into the formula feed or both. In additional configurations and embodiments, improved performance is a mitigated inflammatory response, an increased immune function or both.

In another implementation, a method of formulating a feed ration for an equine animal involves formulating a feed ration for the equine animal, the feed ration including a grain- and forage-based feed and a *Saccharomyces cerevisiae* fermentation product, where the grain- and forage-based feed including a formula feed, wheat products, soy products, alfalfa products, corn products or rice products, and where the *Saccharomyces cerevisiae* fermentation product is present in the feed ration from about 5 grams to about 40 grams per head per day. In additional configurations and embodiments, the feed ration additionally includes forage, where the forage includes one or more of hay or other roughage source. In additional configurations and embodiments, the feed ration is effective to at least one of: mitigate an inflammatory response or increase immune function in the equine animal. In additional configurations and embodiments, the grain- and forage-based feed is present in the feed ration at a level of at least about 3 pounds per head per day. In addition or alternatively, the feed ration may include about 5 to about 10 percent fat by weight and/or feed ration may be formulated for a mature horse.

In yet another implementation, a method of producing an equine animal feed involves combining into a formula feed a grain, a forage and a *Saccharomyces cerevisiae* fermentation product, where the *Saccharomyces cerevisiae* fermentation product is present in the formula feed from about 0.1 to 1.0 percent by weight of the feed. In additional configurations and embodiments, the formula feed further includes a grain product, dried beet pulp, oil, and a protein product, the feed ration may include about 5 to about 10 percent fat by weight and/or about 8 to about 12 percent moisture by weight. In additional configurations and embodiments, production may further involve depositing about 50 pounds of the formula feed into bags.

DETAILED DESCRIPTION

Figure 1:
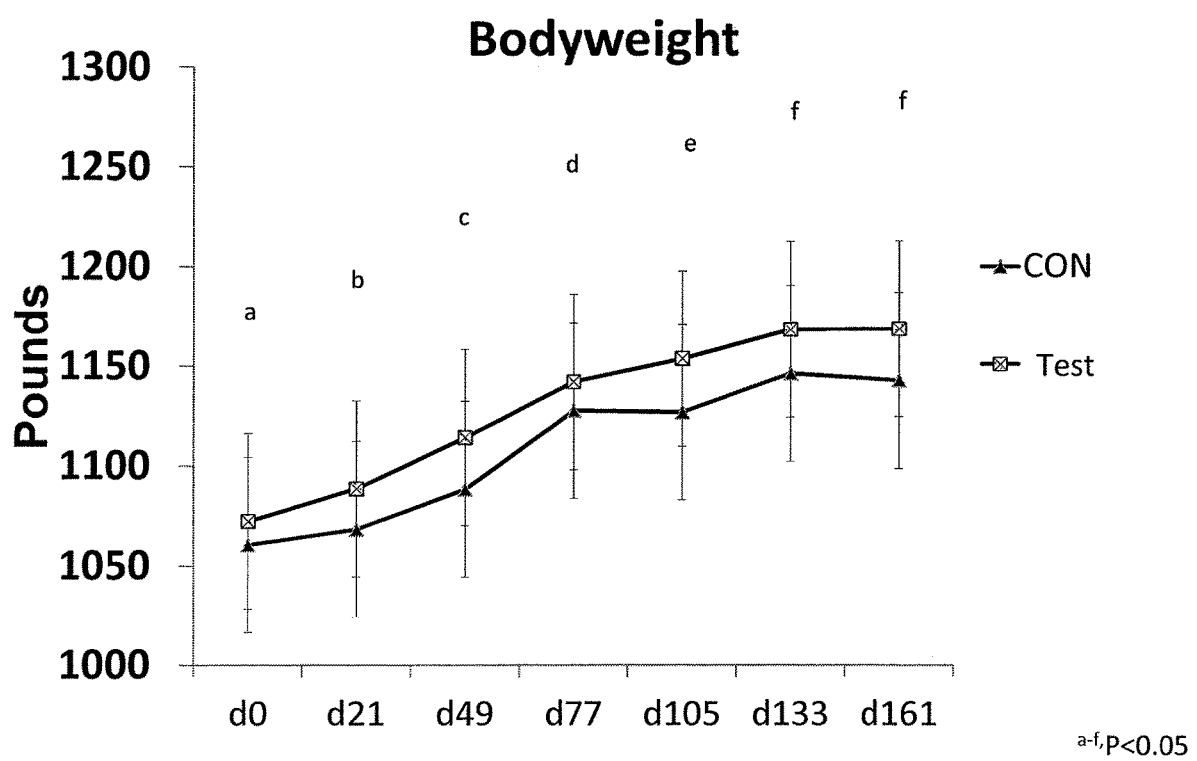
FIG. 1 is a graph illustrating the average change in bodyweight in the control and test groups over the course of Study 1, in which the test groups were fed a yeast fermentation product of the present disclosure.

Equine animals such as horses live past 20 years of age while still competing and leading active lives. Equine animals greater than 20 years old constitute approximately 15 percent of the horse population. With these longer life expectancies due to better veterinary care and better nutrition, equine animals are experiencing additional health issues including Cushing's disease, laminitis and arthritis. In addition, it has been discovered that equine animals experience a decline in immune function as one of the primary effects of aging. More specifically, there are two general types of decline that occur, immunosenescence and inflammatory aging. Immunosenescence is a decline in immune function due to aging, and includes a decreased ability to resist infection increased susceptibility to disease (such as influenza) and reduced responsiveness to vaccination. Inflammatory aging is a chronic, low grade inflammation that is associated with the aging process. This increases the horse's risk for age-associated diseases such as Cushing's disease, laminitis, and arthritis, ultimately leading to an increased mortality risk.

In contrast, applicant's discovery of a nutritional intervention that can improve the health and immune function of equine animals is the result of research and studies into the effects of prebiotics in the equine diet. In view of the issues faced by aging equine animals, applicant has realized that equine animals experience improved health and immune function from ingesting equine feeds that include an effective amount of a yeast fermentation product.

Accordingly the feeding systems, feeding methods and products and manufactures of the present disclosure are applicable to equine animals including but not limited to: horses such as aging horses that may be at least 18 or 20 years old, exercising horses, foals, lactating mares and miniature horses; ponies; donkeys and mules.

The yeast fermentation product disclosed is a prebiotic derived from an anaerobic fermentation process that produces beneficial metabolites containing vitamins, minerals, amino acids, polyphenols and antioxidants, which is a stable product not affected by extreme temperatures, pH, or processing. More specifically, the yeast fermentation product of the present disclosure may be a *Saccharomyces cerevisiae* fermentation product, which is a dried product produced during fermentation of unmodified *Saccharomyces cerevisiae*, including: the products of fermentation, residual yeast cells and yeast cell fragments, and the media utilized during fermentation. In some implementations, the *Saccharomyces cerevisiae* fermentation product is produced from fermentation in a molasses-based broth, which is dried with the culture-media without destroying the yeast factors, B-vitamins and other nutritional fermentation products.

The nutrient profile of the yeast fermentation product may contain about 0.1 to 1.0 percent fat; about 20 to 30 percent protein, about 0.5 to 2.0 percent fiber and about 10 to 30 percent ash by weight of the product. The foregoing nutrient levels may be present in the yeast fermentation product at any range or integer value between the foregoing values. Total polyphenols may be present at about 5 percent GAE (Gallic acid equivalents) as measured by a total polyphenol assay methodology that determines polyphenol content in a product chemically. Beta-glucans may be present at about 10 percent by weight. The oxygen radical absorbance capacity ($ORAC_{hydro}$), which is a measure of how well a product absorbs oxygen radicals, may be about 700 TE/g (micromole trolox equivalent per gram of product), as measured by chemically evaluating the product's water-soluble antioxidant activity. The CAP-e (cell-based antioxidant protection in erythrocytes) level may be about 15.0 GAE/g (Gallic acid equivalent units/gram of product), which serves as an indicator for the level of protection provided to help vasculature, tissue and other cells in the blood stream from oxidative damage. The CAP-e value is a measure of the antioxidant bioavailability of a product at a cellular level and is an assay value derived by comparing the dose of the product that provided 50% inhibition of oxidative damage to the Gallic acid (a known antioxidant) dose that provided 50% inhibition of oxidative damage.

The amount of yeast fermentation product present in combination with the feed may be effective to mitigate an inflammatory response, increase immune function and/or increase weight gain in the equine animal. In addition or alternatively, the amount of yeast fermentation product fed to the animal may be effective to mitigate an inflammatory response and/or increase immune function.

In some exemplary embodiments, the amount or effective amount of the yeast fermentation product in the animal feed is at about 0.1 to 1.0 percent, about 0.1 to 0.5 percent, about 0.5 to 1.0 percent, or at any range or integer value from 0.1 to 2.0 percent by weight of the feed.

In a feed ration or feed formulation, the yeast fermentation product may be provided to the equine animal at a rate or effective rate of about 2 to 40 grams, about 2 to 30 grams, about 2 to 25 grams, about 2 to 20 grams, about 2 to 10 grams, about 2 to 7 grams, about 5 to 40 grams, about 5 to 30 grams, about 5 to 25 grams, about 5 to 20 grams, about 5 to 15 grams, about 5 to 10 grams, or at any range or integer value from 2 to 50 grams per head per day.

In exemplary feeding systems, the yeast fermentation product may be provided to the equine animal at a rate or effective rate of about 4 to about 9 grams per 1000 lbs., or about 0.4 to 0.9 grams per 100 lbs. of the animal, or at any range or integer value from about 4 to about 9 grams per 100 lbs. of the animal.

Prebiotics in the yeas fermentation product may promote the health and growth of beneficial microorganisms in the digestive tract, which can positively affect the overall health of the equine animal. Prebiotics differ from probiotics, which are live microorganisms that are intended to grow and proliferate in the horse's gut. The yeast fermentation product additionally contains bioactive components that promote the health and growth of beneficial microorganisms are nutritional metabolites that include but are not limited to, polyphenols, phytosterols and organic acids. In addition, cell wall components (e.g. beta-glucans, mannans (e.g., mannan-oligosaccharide)) and intracellular components (e.g., minerals, vitamins and amino acids).

The animal feed contains additional nutrients beyond the yeast fermentation product such as starch, fat, protein, fiber, optionally flavorants, vitamins, micronutrients and macronutrients.

Starch such as grains in the animal feed may include, but are not limited to: wheat products such as wheat middlings, alfalfa products such as alfalfa meal and dehydrated alfalfa meal, corn products such as corn grain, ground corn, cracked corn, corn germ meal, rice products such as rice bran, oat products such as oats and oat flour, barley products such as barley and barley flour. Starch may be present in the feed at about 6 to 15 percent, about 6 to 13 percent, about 6 to 12 percent, about 8 to 20 percent, about 8 to 15 percent, about 8 to 12 percent, about 10 to 20 percent, about 10 to 15 percent, about 8 to 10, about 10 to 12 percent, or at any range or integer value from 6 to 25 percent by weight of the feed.

Fat in the animal feed and may include, but are not limited to: plant-derived oils such as soybean oil and vegetable oil and/or flaxseed oil and flaxseed. Fats may be present in the feed at about 3 to 15 percent, about 3 to 13 percent, about 3 to 10 percent, about 3 to 8 percent, about 5 to 15 percent, about 5 to 13 percent, about 5 to 10 percent, about 5 to 8 percent, or at any range or integer value from 3 to 20 percent by weight of the feed.

Protein products may include, but are not limited to: soybean products such as soybean meal and dehulled soybean meal and alfalfa products such as alfalfa hay and alfalfa cubes. Protein may be present in the animal feed at about 12 to 30 percent, about 12 to 25 percent, about 12 to 20 percent, about 12 to 15 percent, about 14 to 30 percent, about 14 to 25 percent, or about 14 to 20 percent, or at any range or integer value from 10 to 35 percent by weight of the feed.

Fiber sources may include, but are not limited to: hay such as grass hay, hay cubes, chopped hay, alfalfa hay, alfalfa cubes, alfalfa pellets, chaff, dried beet pulp, ground rice hulls and soybean hulls. Fiber may be present in the animal feed at about 5 to 20 percent, about 5 to 18 percent, about 10 to 20 percent, about 10 to 18 percent, about 12 to 20 percent, or about 12 to 18 percent, or at any range or integer value from 3 to 20 percent by weight of the feed. In some implementations, the equine animal may have access to the fiber sources as a separate feeding source from the equine animal feed, and for instance may be offered hay or have access to pasture.

Flavorants may include but are not limited to: cane molasses, rosemary extract, natural anise flavor and fenugreek flavor. Flavorants may be present in the animal feed at 0 to about 1 percent, about 0.1 to 1 percent, about 0.1 to 0.5 percent, about 0.5 to 1.0 percent, or at any range or integer value from 0.1 to 2.0 percent by weight of the feed.

Vitamins, micronutrients and macronutrients may include, but are not limited to: sodium chloride calcium carbonate, citric acid, phosphoric acid, L-lysine, choline chloride, vitamin E supplement, ascorbic acid (vitamin C), monocalcium phosphate, dicalcium phosphate, biotin, calcium pantothenate, folic acid, riboflavin supplement, vitamin D3 supplement, vitamin B-12 supplement, vitamin A, niacin, zinc oxide, copper sulfate, calcium iodate, magnesium oxide, DL-methionine, cobalt carbonate, ferrous carbonate, manganous oxide, and sodium selenite. Vitamins, micronutrients and macronutrients may be present in the animal feed at about 1 to 5 percent, about 1 to 3 percent, about 3 to 5 percent, about 3 to 7 percent, or at any range or integer value from 1 to 9 percent by weight of the feed.

A moisture content of the animal feed may be from about 6 to 15 percent, about 8 to 12 percent, or at any range or integer value from 5 to 16 percent by weight of the feed.

The foregoing nutrient components may fall within multiple nutrient categories. For instance, although flaxseed is listed as a source of fat, flaxseed is also a source of fiber and protein.

The animal feed may be free of any of the foregoing components. In addition, the feed may be provided as a complete feed and may serve as a forage replacement. Alternatively, the feed may be provided as a supplemental feed. Further, it has been found to be advantageous to provide the yeast fermentation product in the animal feed as opposed to in supplement form (e.g., tablet or pill form) due to the ability to distribute the yeast fermentation product throughout at least a portion of the feed components in the animal feed. For instance, the yeast fermentation product may be distributed throughout feed pellets containing wheat products, soy products, alfalfa products, corn products or rice products alone or in combination, and the distribution of the yeast fermentation product through the pellets may facilitate gradual digestion and uptake of the product along with other nutrients. Continuing with this example, the feed pellets may form a portion of a formula feed and the mixture of the pellets with other components within the formula feed (e.g., wheat products, soy products, alfalfa products, corn products, rice products and/or extruded nuggets containing any of these products) may further facilitate the gradual digestion and uptake of the yeast fermentation product, as well as provide a balanced diet for the equine animal.

In feeding systems, equine animals may be offered the yeast fermentation product by combining the product in the feed, the yeast fermentation product may form a portion of a formula feed, or combinations thereof. Formula feeds are typically pelleted or extruded feeds that contain a mixture of nutrients targeted for a particular type of animal. Formula feeds contain the yeast fermentation product along with any of the aforementioned starch, fat, protein, fiber, flavorant, vitamin, micronutrient and macronutrient sources and products alone or in any combination. Formula feeds may be forage-based, grain-based, bean-based or any combination of these. In an exemplary embodiment, a formula feed includes the yeast fermentation product along with grains, a soybean product, oils, beet pulp and optionally vitamins, micronutrients and macronutrients. In addition, the formula feed may contain pellets, oil, molasses, forage sources and/or feed nuggets (e.g., flaxseed, oil, rice bran). Further, the yeast fermentation product may be provided in a pelleted feed within the formula feed containing additional nutrients including extruded pellets and any of the nutrient components of the present disclosure. In some implementations, the pelleted feed may comprise about 80 to 90 percent of the formula feed by weight.

The amount of formula feed fed to the equine animal is based on several factors including the animal's size, age, temperament, health status, forage quality (if present in the diet), climate and activity level, and accordingly, feeding rates may differ among animals. For example, for animals fed a diet of the formula feed of the present disclosure but with no added forage such as via pasture grazing or ingesting hay ad libitum, the animal may ingest about 1.3 to about 2.5 pounds of the formula feed per 100 pounds in weight of the animal per day. More particularly, for maintenance animals, the animal may ingest about 1.3 to 1.5 pounds of the formula feed per 100 pounds in weight; for mature light work animals, the animal may ingest about 1.4 to 1.6 pounds of the formula feed per 100 pounds in weight; for moderate work animals, the animal may ingest 1.65 to 1.85 pounds of the formula feed per 100 pounds in weight; for lactating broodmares, the animal may ingest 2.25 to 2.5 pounds of the formula feed per 100 pounds in weight; and for breeding stallions, the animal may ingest about 1.5 to about 1.7 pounds of the formula feed per 100 pounds in weight.

Where an animal is offered forage along with the formula feed, the animal may ingest about 0.6 to 1.2 pounds of the formula feed per 100 pounds in weight. The amount of forage offered to the animal may be about 1 to 1.2 pounds of forage per 100 pounds in weight. In the foregoing examples, the formula feed may contain about 3 to about 7 or about 5 percent fat by weight.

Additional examples may involve providing a formula feed diet with a higher fat content of from about 8 to about 12 or about 10 percent by weight. In these examples, the animal may ingest a reduced amount of the formula feed while intaking an effective amount of the yeast fermentation product as well as the required dietary amounts of fat, protein and vitamins. The animal may have access to hay at the previously described feeding rates and may ingest about 0.25 to about 1.0 pounds of the formula feed per 100 pounds in weight of the animal per day. More particularly, for maintenance animals with minimal activity, the animal may ingest about 0.25 to 0.35 pounds of the formula feed per 100 pounds in weight; for maintenance animals with moderate activity, the animal may ingest about 0.4 to 0.5 pounds of the formula feed per 100 pounds in weight; for maintenance animals with elevated activity, the animal may ingest about 0.5 to 0.6 pounds of the formula feed per 100 pounds in weight; for mature light work animals, the animal may ingest about 0.6 to 0.7 pounds of the formula feed per 100 pounds in weight; for moderate work animals, the animal may ingest 0.8 to 1.0 pounds of the formula feed per 100 pounds in weight; for early gestation (first 250 days), the animal may 0.4 to 0.5 pounds of the formula feed per 100 pounds in weight; for late gestation (first 90 days), the animal may ingest about 0.65 to 0.75 pounds of the formula feed per 100 pounds in weight; and for breeding stallions, the animal may ingest about 0.75 to about 0.9 pounds of the formula feed per 100 pounds in weight.

In some feeding systems, the animal feed of the present disclosure may be soaked in water for about 5 minutes in order to cause water to be absorbed into the feed or components thereof, which may facilitate chewing and ingestion of the feed by the mature horse, for instance, for horses with missing teeth.

It has been found that feeds containing the yeast fermentation product when ingested by the equine animal may improve immune function by increasing antibody response to vaccinations (e.g., influenza vaccinations) and by preventing the gradual rise in inflammatory cytokines associated with aging. Consequently the feeding systems and methods and feed products of the present disclosure may be applicable to mature equine animals such as those animals that have alterations in digestive tract function due to aging or animals that are at least 10, 15, 16, 17, 18, 19 or 20 years of age.

support digestive health of the equine animal by balancing the immune system and gut microbiota, while optimizing gut morphology. For instance, the yeast fermentation product may promote a prebiotic-like activity to promote a healthy balance of bacteria in the lower gastrointestinal tract, while the antioxidant activity helps improve immune function.

Examples

The following examples describe exemplary feeding systems and methods for feeding equine animals feed combined with a yeast fermentation product and should not be construed as limiting.

Study 1:

In this study, horses were fed the animal feed containing the yeast fermentation product to determine the effects of the feed formulation on the production of inflammatory cytokines, both in vitro and in vivo, in aged horses. In addition, the effects of the feed containing the yeast fermentation product were studied to determine the effects on the memory immune response to vaccination using an equine influenza vaccine and to determine the effect on a primary immune response to a novel antigen using an OVA vaccine.

Procedures:

A total of 20 aged horses (ranging in age from 20-33 years) of mixed sex and mixed-breeds were sourced from a herd of (~400) horses residing on the Department of Veterinary Science, Maine Chance Farm, University of Kentucky. All horses were pre-screened to determine levels of inflammatory cytokines (serum TNF-alpha & lymphocyte interferon-gamma production), alpha-MSH (a measure of Equine Cushing's Disease (D. McFarlane, 6 *Ageing Res. Rev.*, 54 (May, 2007), Equine Influenza Hemagglutination inhibition (HI) antibody titers and body condition score (BCS). Treatment groups were blocked according to these measures. Horses were assigned to one of two treatment groups for 161 days: control feed (n=10) and a test feed containing the yeast fermentation product and the control feed (n=10). The control feed was a grain- and forage-based feed and had a nutrient profile according to Table 1. The test feed contained the same nutrient profile as the control feed and additionally contained about 0.1 to about 0.7 percent of the *Saccharomyces cerevisiae* fermentation product by weight of the feed and the horses in the test group ingested approximately 40 grams of the *Saccharomyces cerevisiae* fermentation product per head per day.

TABLE 1

| Base Nutrient Profile of Study 1 feeds | |
| --- | --- |
| Digestible Energy (Mcal/lb) | 1.34 |
| CP (%) | 13.5 |

TABLE 1-continued

| Base Nutrient Profile of Study 1 feeds | |
| --- | --- |
| Crude fat (%) | 10.0 |
| Acid Detergent Fiber (%) | 22.7 |
| Neutral Detergent Fiber (%) | 34.7 |
| Starch (%) | 5.2 |
| Water Soluble Carbs (%) | 10.2 |
| Calcium (%) | 1.2 |
| Phosphorus (%) | 0.6 |
| Magnesium (%) | 0.27 |
| Potassium (%) | 1.37 |
| Sodium (%) | 0.23 |
| Iron (ppm or mg/kg) | 705 |
| Zinc (ppm or mg/kg) | 280 |
| Copper (ppm or mg/kg) | 80 |
| Vitamin E (IU/lb) | 200 |

Horses were co-mingled on pasture during the study and had free access to water, a salt block and to a run-in-shelter. In addition, grass hay was provided to the horses on pasture via round bales (free choice access at all times). Horses underwent a two week acclimation period, beginning on (day −14) prior to the study to become accustomed to being fed in individual feed pens and to adjust the new feed intake. For horses on the treatment diets, the transition to the new feeds was made in the following way:

Day −14 thru day −11: 25% new feed, 75% old feed
Day −10 thru day −7: 50% new feed, 50% old feed
Day −6 thru day −3: 75% new feed, 25% old feed
Day −2 thru day −1: 100% new feed During this acclimation period, daily feed amounts were individually determined based on each horse's body condition score and body weight. Therefore, daily orts (weighbacks) were recorded at each meal, and feeding rates were adjusted based on these if necessary. If a horse left more than 0.5 lb at one meal for 3 meals in a row, then ration was reduced by no more than 0.5 lb/day until horse is consuming the entire ration The horses wore halters tagged with the pen number and each individual pen marked with the matching halter number to ensure appropriate administration of treatment feedings. In addition, the pens were color-coated with tape to distinguish between the different treatment groups. If needed, hay was group fed. Duplicate feed (hay and concentrate) samples were obtained at d −14, d 0, d 35, and d 70.

Sample Collection Timeline: The study involved a two week acclimation period of which there was a clinical exam performed on all horses as well as at the end of the study. Feeding of treatments began for all groups beginning on week 0 (day 0) and continued until day 161. Body condition measures (body condition scores ("BCS"), weight and % body fat) was determined prior acclimation(d −14) and body weight was determined weekly during the study. Body fat was again determined on day 161. Serum, plasma and heparinized blood was collected prior to acclimation (day −14) and beginning week 0 (day 0), and continued thereafter every two weeks for measurement of inflammatory cytokines, oxidative status, and to determine CBC/hematocrit profiles. In addition, plasma samples were obtained at d −14, d 0, d 35, and d 70 and stored and shipped to an outside lab for fatty acid analysis. Vaccination (Equine Influenza and OVA of all horses occurred. All horses were vaccinated with a novel antigen (OVA) at day 77 and day 105, and were vaccinated with Equine Influenza (Calvenza) at day 105. Blood samples were taken prior to vaccination and two weeks post-vaccination.

Materials and Methods:

Measurement of body weight, BCS, and % body fat: Body weight was measured weekly. In addition, body condition score (BCS) was determined using the Henneke scoring system which uses a scale of 1-9 (1=emaciated & 9=extremely obese (D. R. Henneke, G. D. Potter, J. L. Kreider, B. F. Yeates, 15 *Equine Vet J.*, 371 (1983).). Individual horse scores were determined by using the average score given by 3 trained persons. Percent body fat was also determined by using ultrasound measurement of croup fat thickness at approximately 11 cm caudal from the tail, head and 10 cm off the midline. This measurement is used to calculate percent body fat using the equation: % body fat=[5.4*(ultrasound fat depth in cm)+2.47](R. Kane, M. Fisher, D. Parrett, L. Lawrence, in 10*th Equine Nutrition Symposium.* (1987), pp. 127-131.).

Measurement of Inflammatory Cytokines:

Serum blood samples and heparinized blood samples was collected from each horse every two weeks for the measurement of inflammatory cytokine production determined by the following assays.

A. Real Time-PCR (RT-PCR) was used to determine nascent expression of peripheral pro- and anti-inflammatory cytokine gene expression. Samples were stored until the end of the study and remained "unprocessed" until further decided upon by both parties. Approximately 3.0 ml of whole blood was collected into PAXgene™ blood RNA tubes (Qiagen/PreAnalytiX, Valencia, Calif.). The tubes were incubated at room temperature for 24 h and then stored at −20° C. until assayed. Once thawed, total RNA were extracted using the PAXgene™ blood RNA extraction kit (Qiagen) using the manufacturer's protocol. Reverse transcription reactions were performed, using 0.5 μg of each RNA sample and reverse transcription master mix (Promega, Madison, Wis.). The reactions are incubated at 42° C. for 15 min and 95° C. for 5 min. Samples of cDNA were stored at −20° C. until analyzed by RT-PCR. Cytokine gene expression were measured in cDNA samples using equine cytokine gene-specific primer-probe sets for IL-1□, IL-6, IL-10, IFN-γ, and TNF-α. Beta-glucuronidase (β-GUS) served as an internal control gene to normalize gene expression levels. Each reaction contains 5 μl cDNA and 20 μl of master mix containing the following: 6.25 μl nuclease-free water (Qiagen); 1.25 μl 20× assay mix for primer/probe set of interest (Applied Biosystems); and 12.5 μl TaqMan™ (Applied Biosystems, Foster City, Calif.). All reactions were incubated in duplicate wells for 95° C. for 10 min, followed by 40 cycles of 95° C. for 15 s and 60° C. for 60 sec in an Applied Biosystems 7500 sequence detection system. Data analysis were performed by the system software (ABI), and changes in gene expression were calculated by relative quantitation (RQ), where $RQ=2^{-\Delta\Delta CT}$ (K. J. Livak, T. D. Schmittgen, 25 *Methods,* 402 (2001). The calibrator for each horse were its initial sample collected prior to treatment.

B. Intracellular staining (ICS) was performed to determine in vitro production of IFN-γ and TNFα by freshly isolated and stimulated peripheral blood mononuclear cells (PBMC). Heparinized blood samples were collected aseptically from the jugular vein. PBMC were purified by Ficoll-Paque Plus™ (Amersham Biosciences, Piscataway, N.J.) gradient centrifugation, washed in sterile PBS, pH 7.2 (Gibco, Grand Island, N.Y.), counted using a Vicell Counter-XR (Beckman Coulter, Miami, Fla.), resuspended in c-RPMI 1640 (Gibco) media supplemented with 2.5% fetal equine serum (FES, Sigma Aldrich, St. Louis, Mo.), 2 mM L-glutamine (Sigma) and 100 U/ml penicillin, streptomycin (Sigma) and 55 μM 2-mercaptoethanol (Gibco). Isolated PBMC ($3\times10^6$/ml) from each horse were placed in 24-well plates and incubated with c-RPMI-2.5% FES media alone or c-RPMI-2.5% FES stimulated with PMA and ionomycin. All wells received brefeldin A and incubated at 37° C. 5% $CO_2$ for 4 hrs. Following the incubation, cells were placed into duplicate wells of a 96-well V-bottom plate, fixed in 2% paraformaldehyde (Sigma), and stored overnight at 4° C. The fixed cells were then washed once in PBS-saponin buffer. Intracellular staining for IFNγ staining were performed. Briefly, fixed cells are washed in PBS-saponin buffer (PBS supplemented with 1% FBS; Sigma and 0.1% saponin; Sigma and 0.1% sodium azide; Sigma) and then stained with CC302 mouse anti-bovine IFNγ FITC-PE (Serotec, Raleigh, N.C.) or an isotype control antibody mouse IgG1-PE (Serotec) at a concentration of 1 μg/ml in PBS-saponin buffer and incubated on ice for 30 min. CC302 antibody has been previously shown to cross-react with equine IFNγ. After the incubation cells are washed twice in PBS-saponin buffer and resuspended in FACS flow. Intracellular staining for TNFα were performed using an anti-equine TNFα monoclonal antibody (HL801, kindly provided by Dr. Rob MacKay, University of Florida). The antibody-labeled cells were incubated for an additional 30 min on ice with FITC-conjugated goat $F(ab')_2$ anti-mouse IgG (H+L) (Caltag Laboratories, Burlingame, Calif.). All IFNγ and TNFα stained samples were resuspended in FACS flow for flow cytometric acquisition and analysis. Markers were set using the isotype control (MOPC, Sigma) antibody-labeled cells from each horse for each treatment and used to determine the percent of IFNγ-producing or TNFα producing lymphocytes in the corresponding media or PMA-stimulations. Mean fluorescence intensity (MFI) was also recorded for each sample.

C. TNFα ELISA to were used to determine concentrations of serum TNFα protein. Serum blood tubes were collected aseptically from the jugular vein. Serum were separated from peripheral blood and stored at −20° C. until assayed. Serum concentrations of TNFα protein were determined using a commercially available equine TNFα ELISA kit (Endogen, Rockford, Ill.). This assay was validated for equine serum samples diluted at a minimum of 1:3 in reagent diluent (16). All steps of the ELISA were performed by the manufacturer's instructions except for the following: the recombinant TNFα standard provided were prepared in 20% FES and reagent diluent to make a top standard of 2000 pg/ml and a low standard of 15.6 pg/ml; all samples were diluted 1:5 in reagent diluent and added to 96-well plates in triplicate; and single absorbance measured at $A_{450}$.

D. IL-6 ELISA to measure serum pro-inflammatory IL-6. Serum blood tubes were collected aseptically from the jugular vein and serum separated. Briefly, a polyclonal goat anti-horse IL-6 antibody (AF1886, R&D Systems, Inc., Minneapolis, Minn.) were used for coating of the ELISA plates (Immunoplate Maxisorp, Nalge Nunc Int., Rochester, N.Y.). The antibody were diluted to a final concentration of 1 μg/mL in carbonate buffer (15 mmol $Na_2CO_3$, 35 mmol $NaHCO_3$, pH 9.6) and incubated overnight at 4° C. Afterwards, the coating solution were discarded and the plates were blocked for 30 min at room temperature by addition of phosphate buffered saline (PBS, pH 7.2) containing 0.5% (w/v) bovine serum albumin. Plates were washed five times with phosphate buffer (2.5 mmol $NaH_2PO_4$, 7.5 mmol $Na_2HPO_4$, 145 mmol NaCl, 0.1% (v/v) Tween 20, pH 7.2). A recombinant equine IL-6 (1886-EL, R&D Systems, Inc., Minneapolis, Minn.) diluted in 2-fold serial dilutions ranging from 50 to 0.78 ng/mL were used as standard to determine IL-6 concentrations in the samples. The serum were appropriately diluted in phosphate buffer, added to the plates in triplicate wells and incubated for 90 min at room temperature. After five washed, biotinylated goat anti-horse IL-6 (AF1886, R&D Systems, Inc., Minneapolis, Minn.) diluted 1:100 in phosphate buffer, were added and incubated for 60 min and washed again. Then, a streptavidin-horseradish peroxidase solution (Jackson ImmunoResearch Lab., West Grove, Pa.) were added to the plates for another 30 min After a final wash, substrate buffer (33.3 mmol citric acid, 66.7 mmol $NaH_2PO_4$, pH 5.0) were added and incubated for 20 min in the dark. The reaction were stopped by adding one volume of 0.5 mol $H_2SO_4$. Plates were read in an ELISA reader (Bio-Tek, Winooski, Vt.) at 450 and 630 nm absorbance. The IL-6 ELISA has an analytical sensitivity of 780 pg/mL.

Vaccination:

On day 56 of the study, all horses received two separate vaccinations, one vaccination with a commercially available, inactivated Equine Influenza vaccine, Calvenza (OH/03 & KY/95 & NM/93), and one vaccination with a novel antigen, ovalbumin (OVA, 20 ug/ml, Sigma). Prior to vaccination and two weeks post vaccination, serum and heparinized blood were collected to determine influenza and ova specific immune responses using the following assays.

Measurement of Humoral Immune Responses to Vaccination:

A. Antigen Specific ELISA (Influenza & OVA.) & Hemagglutination-inhibiting (HI): To determine specific humoral immune responses prior to and post vaccination, the following assays were used to determine the concentrations of equine influenza antibodies specific to the antigen being tested. Serum samples were assayed for EIV-specific antibody using a modified ELISA procedure. Briefly, 100 HA units per well of purified influenza virus (A/equine/KY/5/02) were coated onto 96-well polystyrene plates (IMMULON®, Dynatech Laboratories Inc., Chantilly, Va.) and incubated overnight at 4° C. Following, plates were washed with PBS/0.05% TWEEN®-20 (PBS-T; Sigma, St. Louis, Mo.) and blocked with 2% non-fat dried milk powder in PBS-T (Sigma) for 1 h at 37° C. Serial dilutions of a serum sample from an influenza virus hyperimmune horse was used to establish a standard curve. This allows for the calculation of relative antigen-specific antibody concentrations in all experimental serum samples. Serum samples were appropriately diluted in PBS-T, so that OD values fall within the standard curve (for total IgG at 1:300, IgGa & IgGb at 1:300 and IgG(T) at 1:100). Plates were then incubated in triplicate wells for 90 min at 37° C. Each plate also included a negative control serum for Eq/KY/02. Plates were washed with PBS-T and incubated for 1 h at 37° C. with monoclonal antibodies specific for IgGa (CVS 40), IgGb (CVS 39) and IgG(T) (CVS 48) (D. P. Lunn, M. A. Holmes, W. P. Duffus, 74 *Immunology*, 251 (1991). Following washes with PBS-T, plates were incubated with horseradish peroxidase-conjugated goat-anti-mouse IgG antibody (Jackson Laboratories Inc., West Grove, Pa.) for 1 h at 37° C. Again, plates were washed and developed by addition of substrate (KPL, Gaithersburg, Md.) and ended by the addition of stop solution (KPL). The optical density at 450 nm of each well was determined using an ELISA reader (Bio-RAD, Hercules, Calif.). Relative serum antibody concentrations expressed as ELISA units was calculated by comparison with a standard curve constructed using the dilutions of the positive control serum. This above method was used (except plates were coated with OVA at 10 ug/well) to determine the antibody response to the OVA vaccination. In addition serum hemagglutination-inhibiting (HI) antibodies against KY02 were measured, as described (OIE, *Manual of diagnostic tests and vaccines for terrestrial animals*. (Office International des Epizooties., Paris, ed. 6th, 2008), vol. 1 & 2, pp. 1413).

Measurement of Cell-Mediated Immune Responses to Vaccination:

To determine antigen specific (influenza and OVA) cell-mediated immune responses, heparinized blood samples were collected aseptically from the jugular vein prior to and post vaccination. PBMC were immediately purified by FICOLL-PAQUE® Plus (Amersham Biosciences, Piscataway, N.J.) gradient centrifugation, washed three times in sterile PBS, pH 7.2 (Gibco, Grand Island, N.Y.), counted using a VICELL™ Counter-XR (Beckman Coulter, Miami, Fla.), and resuspended in c-RPMI 1640 (Gibco) media supplemented with 2.5% fetal equine serum (FES, Sigma Aldrich, St. Louis, Mo.), 2 mM L-glutamine (Sigma) and 100 U/ml penicillin, streptomycin (Sigma) and 55 µM 2-mercaptoethanol (Gibco). For EIV in vitro stimulation, $10^7$ PBMC in 1 ml c-RPMI-2.5% FES were incubated at 37° C., 5% $CO_2$ for 45 min with $10^{3.5}$ $EID_{50}$ Eq/KY/02 or with AF as a mock control sample (C. C. Breathnach, R. Rudersdorf, D. P. Lunn, 98 *Vet Immunol Immunopathol*, 127 (April, 2004)). After incubation, all cells were pelleted by centrifugation at 500×g for 5 min to remove the virus inoculum. All virus-stimulated and unstimulated PBMC were resusupended in c-RPMI-2.5% FES for subsequent immunoassay, see below. For OVA in vitro stimulation, PBMC was incubated with 3 ug of OVA for a total of 24 hrs.

Determination of EIV- and OVA-specific IFN-γ production: Aliquots of $4 \times 10^6$ stimulated PBMC, prepared as described above, were plated in duplicate wells of 24-well plates and incubated for 24 h at 37° C., 5% $CO_2$. Brefeldin A (10 µg/ml; Sigma) was added to all wells for an additional 4 h at 37° C., 5% $CO_2$. Afterwards, the lymphocyte fractions of the PBMC cultures were fixed in 100 µl 2% paraformaldehyde overnight at 4° C. The next day, fixed cells were washed once in PBS-saponin buffer (PBS supplemented with 1% FBS; Sigma and 0.1% saponin; Sigma and 0.1% sodium azide; Sigma) and intracellular staining for IFN-γ were performed, as previously described using a direct staining method (C. C. Breathnach et al., 112 *Vet Immunol Immunopathol*, 199 (2006)). Each aliquot of cells were resuspended in FACS flow for flow cytometric acquisition using a FACSCALIBUR™ (Becton Dickinson, San Jose, Calif.). CELL QUEST™ (Becton Dickinson) were used to determine the percent of EIV or OVA-specific $IFNg^+$ lymphocytes.

Measurement of EIV- and OVA-specific lymphoproliferative responses: Quadruplicate wells of influenza- and OVA-stimulated cells ($2 \times 10^5$ per well) from each horse were incubated in 96-well culture plates (TPP, Trasadingen, Switzerland) for 72 h at 37° C., 5% $CO_2$. Plates were then pulsed with $^3$H-thymidine (1 µCi per well) (MP Biomedicals, Solon, Ohio) for the final 18 h. Radioactive thymidine uptake was measured using a Tomtec harvester (J/B Industries, Inc., IL) and liquid scintillation counting (Wallac Inc., Gaithersburg, Md.). EIV- and OVA-specific lymphoproliferation results were expressed as stimulation indexes (SI), calculated by dividing the mean thymidine incorporation (CPM) of the stimulated cells by media-stimulated cells.

Real-time PCR quantitation of EIV- and OVA-specific cytokine mRNA expression: Determination of EIV- and OVA-specific IFNg, IL-2, IL-4, and IL-13 mRNA production was measured using real-time PCR (Table 3). Contents of the $4 \times 10^6$ influenza and OVA-stimulated PBMC cultures, as described above, were centrifuged, and each cell pellet were resuspended in 500 µl RNA-STAT 60 (Tel-Test Inc., Friendswood, Tex.). Total RNA were extracted from each sample using the manufacturer's protocol. Reverse transcription reactions and RT-PCR were performed, as described above. Results expressed as relative quantity (RQ) calculated as $2^{-\Delta\Delta C_T}$.

Statistical Analysis: Data was checked for normality and log transformed if necessary. A completely randomized factorial split-plot design was used to test the effect of treatment, time, and treatment*time interaction. ANOVA was done with mixed models and least squares means compared with Fisher's LSD. Preplanned contrasts were performed on baseline vs. d161 for each treatment, and at d161 for each treatment. Significance level=P<0.05, trend=P<0.10.

Figure 2:
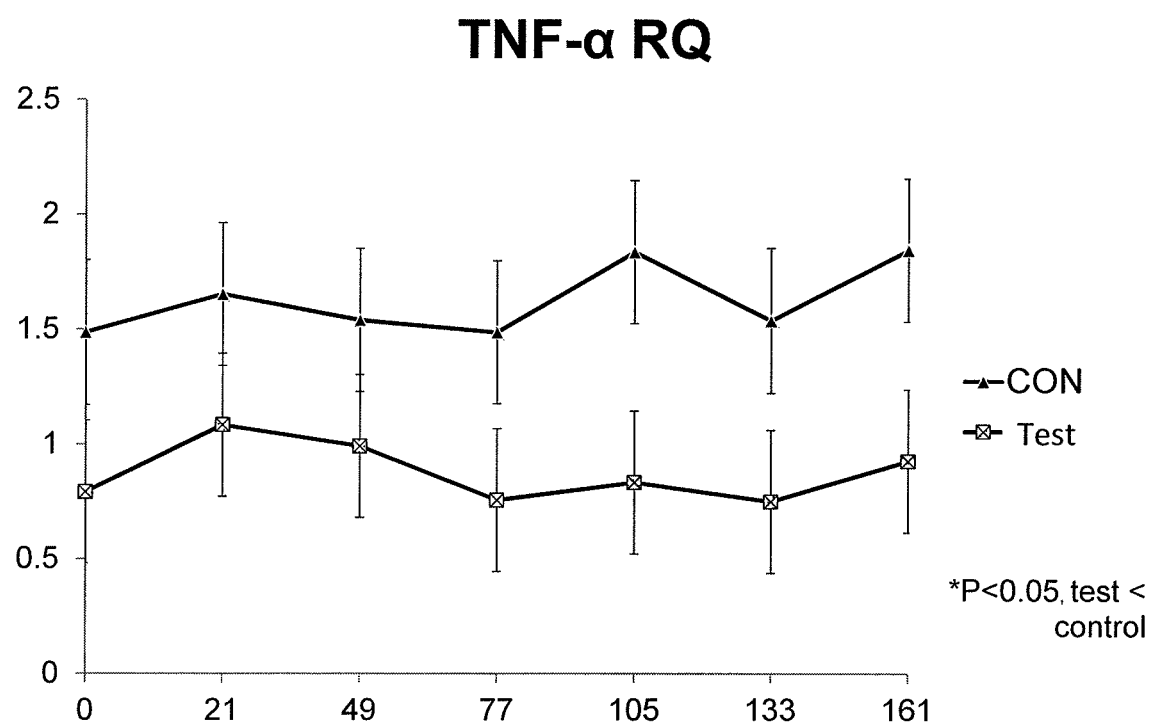
FIGS. 2 and 3 are graphs illustrating the average level of TNF-α in the control and test groups over the course of Study 1.
Figure 3:
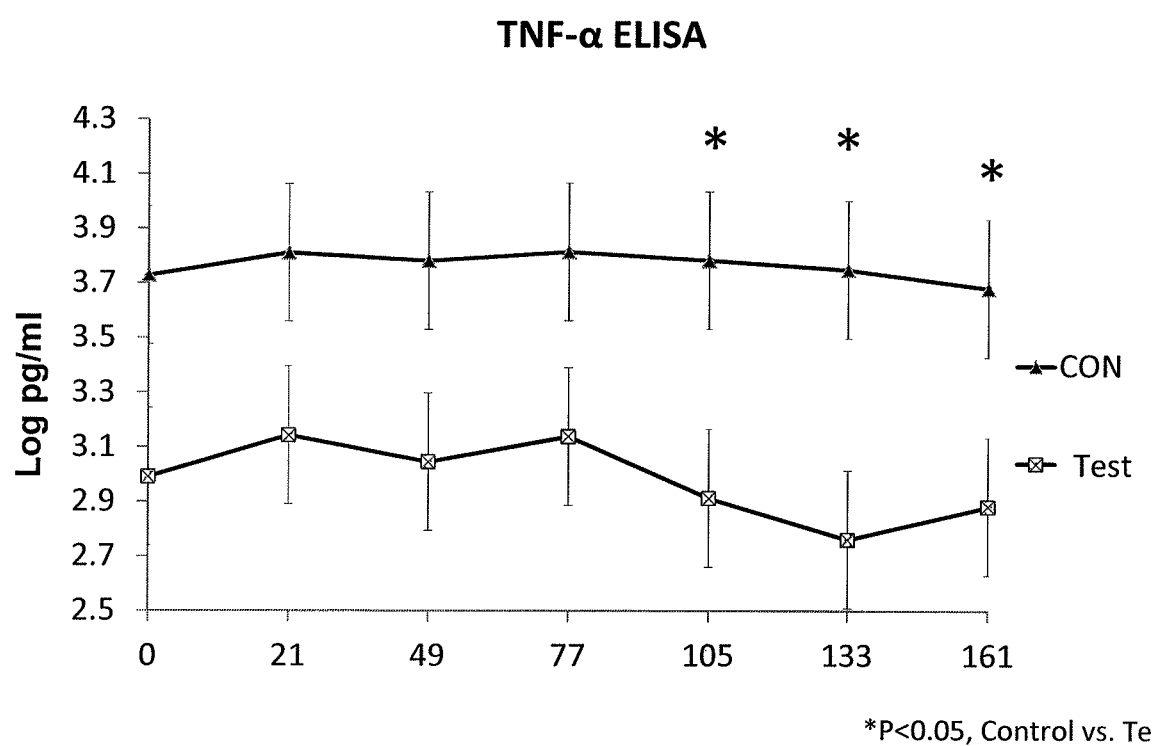

Results:

All horses gained weight (FIG. 1) and increased body condition score over time. The cytokine TNF-α, one of the cytokines that has been associated with inflammatory aging, was lower in the test group than the control group at the end of the study (P<0.05) (FIGS. 2 and 3). There were no effects of diet on vaccination response, but there was a negative correlation between OVA titer and age (R=−0.32; P<0.05).

Study 2:

In this study, horses were fed the animal feed containing the yeast fermentation product at different levels in the diet to determine the effects of the feed formulation on the production of inflammatory cytokines and to determine the effects on the memory immune response to vaccination.

Procedures:

A total of 32 horses of mixed sex and mixed-breeds were used in this study. All horses were obtained from the existing herd of (~400) horses residing on the Department of Veterinary Science, Maine Chance Farm, University of Kentucky. Treatment groups were blocked according to immune parameters. Horses were assigned to one of four treatment groups for 84 days: control (n=8), test ration 1 (control feed+5 grams of the *Saccharomyces cerevisiae* fermentation product per head per day; n=8), test ration 2 (control feed+10 grams of the *Saccharomyces cerevisiae* fermentation product per head per day; n=8), test ration 3 (control feed+25 grams of the *Saccharomyces cerevisiae* fermentation product per head per day; n=8). The control feed was a grain- and forage-based feed having the nutrient profile of Table 2. The test feed contained the same nutrient profile as the control feed and additionally contained about 0.1 to about 0.7 percent of the *Saccharomyces cerevisiae* fermentation product by weight of the feed.

TABLE 2

Base Nutrient Profile of Study 2 feeds

| | |
|---|---|
| Crude Protein (%) | 14 |
| Crude fat (%) | 5.5 |
| Lysine (%) | 0.7 |
| Crude Fiber (%) | 18 |
| Starch (%) | 12 |
| Sugars (%) | 7 |
| Calcium (%) | 1.5 |
| Phosphorus (%) | 0.4 |
| Magnesium (%) | 0.33 |
| Zinc (ppm or mg/kg) | 220 |
| Vitamin A (IU/lb) | 3500 |
| Vitamin E (IU/lb) | 140 |

Horses were allowed free-choice access to mixed-grass hay while housed on pasture and were fed individually twice daily. Horses were weighed, assigned body condition score, and blood samples were taken throughout the study to measure inflammatory cytokines tumor necrosis factor-alpha (TNF-α), interleukin-6 (IL-6), and interferon-gamma (IFN-γ) using RT-PCR, intracellular staining/flow cytometry (IS/FC), and ELISA techniques.

As in Study 1, in Study 2, horses were subjected to a two week acclimation period, beginning on (day −14) prior to the study to become accustomed to being fed in individual feed pens and to adjust the new feed intake.

Sample Collection Timeline: Blood samples, body weights and body condition scores were taken on days 0, 35, 56 and 86. Vaccination with a novel antigen (KLH) occurred at day 28 and day 42 and with an equine influenza vaccine (KY97 Fluvac Innovator; Zoetis) on day 42. Prior to vaccination and two weeks post-vaccination (day 56), blood samples were collected to determine immune responses both CMI and antibody.

Materials and Methods:

Body weight, body condition score, and CBC/ChemProfile Measurements were performed in the same manner as Study 1.

Assays to determine Inflammatory Cytokine Production: Blood samples were collected from each horse for the measurement of inflammatory cytokine production determined by the following assays.

A. Paxgene Tube, Real Time-PCR (RT-PCR) was used to determine nascent expression of peripheral pro- and anti-inflammatory cytokine gene expression and the methodology was performed in the same manner as Study 1.

B. PBMC Intracellular staining (ICS) were performed to determine in vitro production of IFNγ and TNFα by freshly isolated and stimulated peripheral blood mononuclear cells (PBMC) and the methodology was performed in the same manner as Study 1.

C. TNFα ELISA to were used to determine concentrations of serum TNFα protein and was performed in the same manner as Study 1.

D. IL-6 ELISA to measure serum pro-inflammatory IL-6 was performed in the same manner as Study 1.

E. CRP ELISA Serum blood tubes were collected aseptically from the jugular vein and serum separated. A commercially available equine specific kit (KAMIYA BIO-MEDICAL COMPANY) were used to measure C-reactive Protein (CRP) in the serum.

F. PGE2 Concentrations of PGE2 in serum were determined using an enzyme immunoassay kit (Cayman Chemical Company, Ann Harbor, Mich.) according to the manufacturer's instructions.

Assays to Determine Humoral Immune Responses to Vaccination:

Antigen Specific ELISA (Influenza & KLH) & Hemagglutination-inhibiting (HI): To determine specific humoral immune responses prior to and post vaccination, the following assays are used to determine the concentrations of equine influenza antibodies specific to the antigen being tested. Serum samples were assayed for EIV-specific antibody using a modified ELISA procedure. Briefly, 10 HA units per well of purified influenza virus (A/equine/KY/5/02) were coated onto 96-well polystyrene plates (IMMULON®, Dynatech Laboratories Inc., Chantilly, Va.) and incubated overnight at 4° C. Following, plates were washed with PBS/0.05% TWEEN®-20 (PBS-T; Sigma, St. Louis, Mo.) and blocked with 2% non-fat dried milk powder in PBS-T (Sigma) for 1 h at 37° C. Serial dilutions of a serum sample from an influenza virus hyperimmune horse were used to establish a standard curve. This allows for the calculation of relative antigen-specific antibody concentrations in all experimental serum samples. Serum samples were appropriately diluted in PBS-T, so that OD values fall within the standard curve (for total IgG at 1:300, IgGa & IgGb at 1:300 and IgG(T) at 1:100). Plates will then be incubated in triplicate wells for 90 min at 37° C. Each plate will also include a negative control serum for Eq/KY/02. Plates were washed with PBS-T and incubated for 1 h at 37° C. with a polyclonal goat-anti-horse-HRP antibody (Jackson Laboratories Inc., West Grove, Pa.). Again, plates were washed and developed by addition of substrate (KPL, Gaithersburg, Md.) and ended by the addition of stop solution (KPL). The optical density at 450 nm of each well were determined using an ELISA reader (BioRAD, Hercules, Calif.). Relative serum antibody concentrations expressed as ELISA units were calculated by comparison with a standard curve constructed using the dilutions of the positive control serum. This above method were used (except plates were coated with KLH at 10 ug/well) to determine the antibody response to the KLH vaccination. In addition serum hemagglutination-inhibiting (HI) antibodies against KY02 are measured, as described (OIE 2008).

Assays to Determine Cell-Mediated Immune Responses to Vaccination:

To determine antigen specific (influenza and KLH) cell-mediated immune responses, heparinized blood samples were collected aseptically from the jugular vein prior to and post vaccination. PBMC were immediately purified by FICOLL-PAQUE® Plus (Amersham Biosciences, Piscataway, N.J.) gradient centrifugation, washed three times in sterile PBS, pH 7.2 (Gibco, Grand Island, N.Y.), counted using a VICELL™ Counter-XR (Beckman Coulter, Miami, Fla.), and resuspended in c-RPMI 1640 (Gibco) media supplemented with 2.5% fetal equine serum (FES, Sigma Aldrich, St. Louis, Mo.), 2 mM L-glutamine (Sigma) and 100 U/ml penicillin, streptomycin (Sigma) and 55 µM 2-mercaptoethanol (Gibco). For EIV in vitro stimulation, $10^7$ PBMC in 1 ml c-RPMI-2.5% FES were incubated at 37° C., 5% $CO_2$ for 45 min with $10^{3.5}$ $EID_{50}$ Eq/KY/02 or with AF as a mock control sample (Breathnach, Rudersdorf et al. 2004). After incubation, all cells were pelleted by centrifugation at 500×g for 5 min to remove the virus inoculum. All virus-stimulated and unstimulated PBMC were resuspended in c-RPMI-2.5% FES for subsequent immunoassay, see below. For OVA in vitro stimulation, PBMC were incubated with 3 ug of OVA for a total of 24 hrs.

Determination of EIV- and KLH-specific IFN-γ production: Aliquots of $4 \times 10^6$ stimulated PBMC, prepared as described above, were plated in duplicate wells of 24-well plates and incubated for 24 h at 37° C., 5% $CO_2$. Brefeldin A (10 µg/ml; Sigma) was added to all wells for an additional 4 h at 37° C., 5% $CO_2$. Afterwards, the lymphocyte fractions of the PBMC cultures were fixed in 100 µl 2% paraformaldehyde overnight at 4° C. The next day, fixed cells were washed once in PBS-saponin buffer (PBS supplemented with 1% FBS; Sigma and 0.1% saponin; Sigma and 0.1% sodium azide; Sigma) and intracellular staining for IFNg were performed, as previously described using a direct staining method (Breathnach, Sturgill-Wright et al. 2006). Each aliquot of cells were resuspended in FACS flow for flow cytometric acquisition using a FACSCALIBUR™ (Becton Dickinson, San Jose, Calif.). CELL QUEST™ (Becton Dickinson) were used to determine the percent of EIV or KLH-specific $IFNg^+$ lymphocytes.

Real-time PCR quantitation of EIV- and KLH-specific cytokine mRNA expression: Determination of EIV- and KLH-specific IFNg, IL-2, IL-4, and IL-13 mRNA production were measured using real-time PCR (Table 3). Contents of the $4 \times 10^6$ influenza and OVA-stimulated PBMC cultures, as described above, were centrifuged, and each cell pellet were resuspended in 500 µl RNA-STAT 60 (Tel-Test Inc., Friendswood, Tex.). Total RNA were extracted from each sample using the manufacturer's protocol. Reverse transcription reactions and RT-PCR were performed, as described above. Results were expressed as relative quantity (RQ) calculated as $2^{-\Delta CT}$.

Statistical analysis was performed in the same manner as Study 1.

Figure 4:
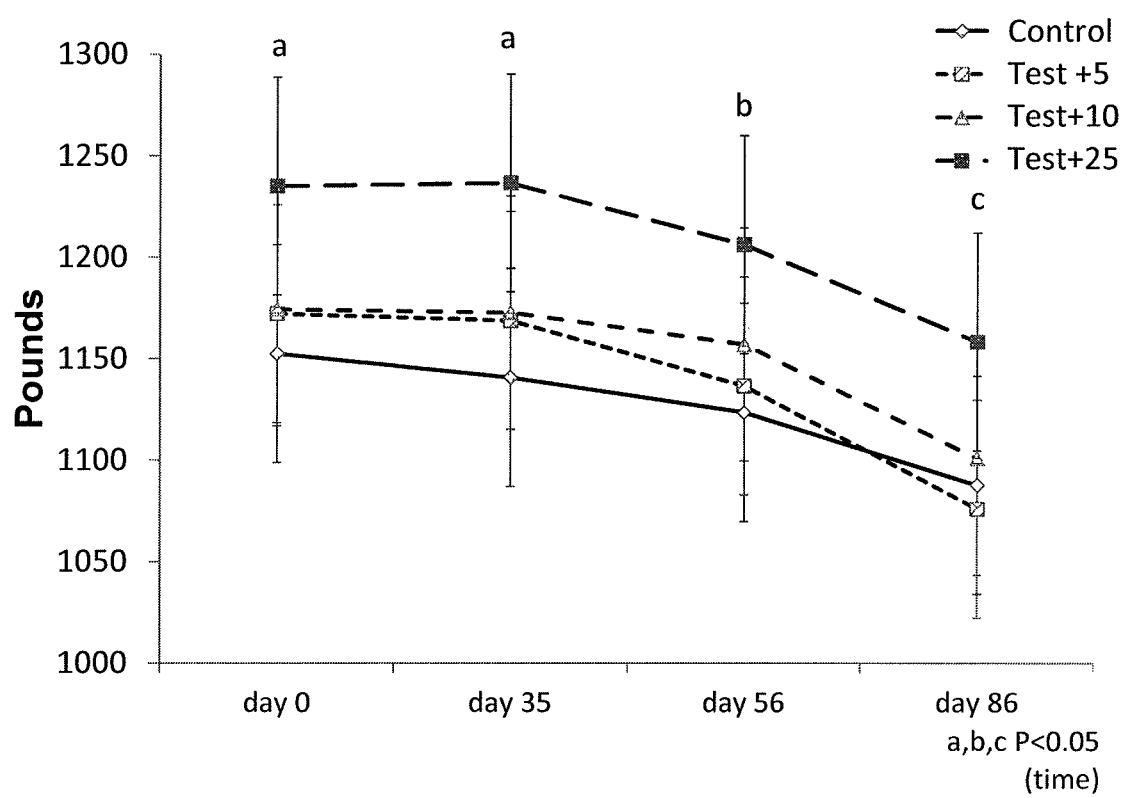
FIG. 4 is a graph illustrating the average change in bodyweight in the control and test groups 1, 2 and 3 over the course of Study 2, in which the test groups were fed different levels of a yeast fermentation product of the present disclosure.
Figure 5:
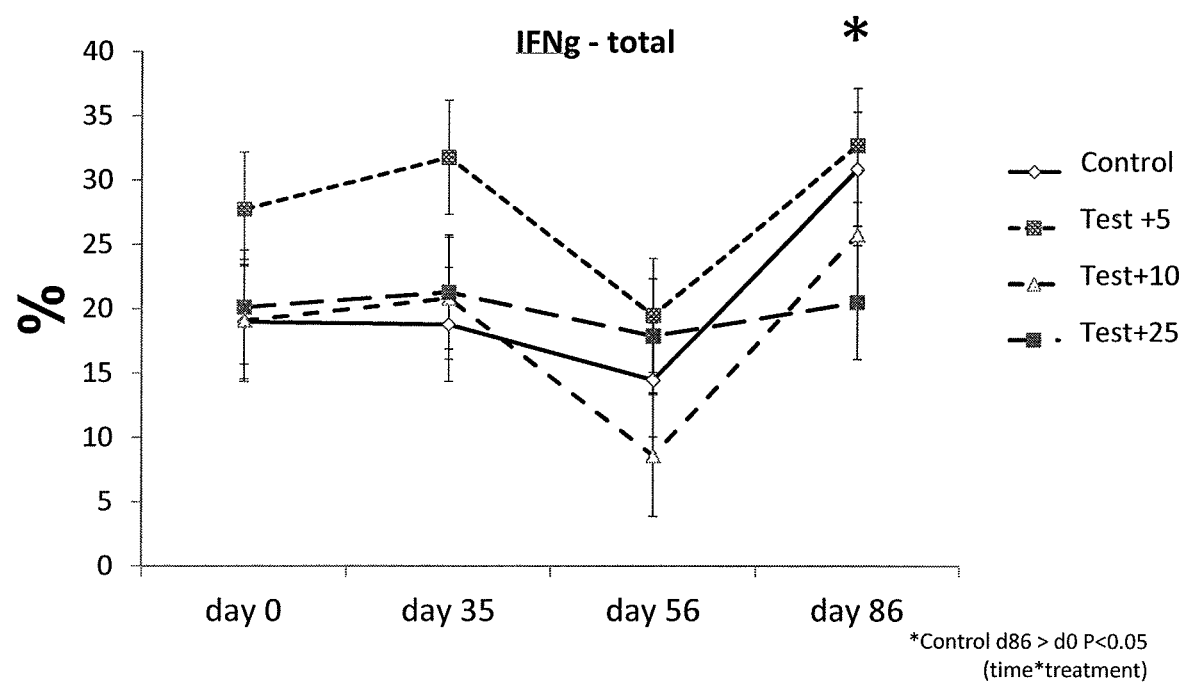
FIGS. 5 and 6 are graphs illustrating the average level of IFN-γ in the control and test groups 1, 2 and 3 over the course of Study 2.
Figure 6:
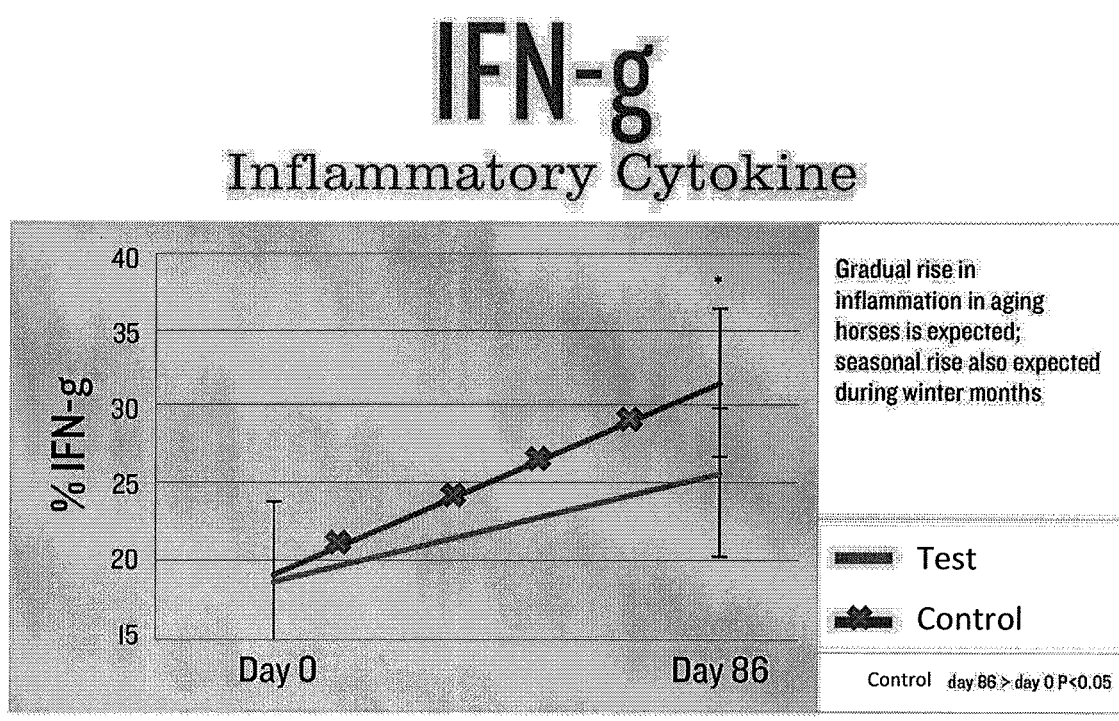
Figure 7:
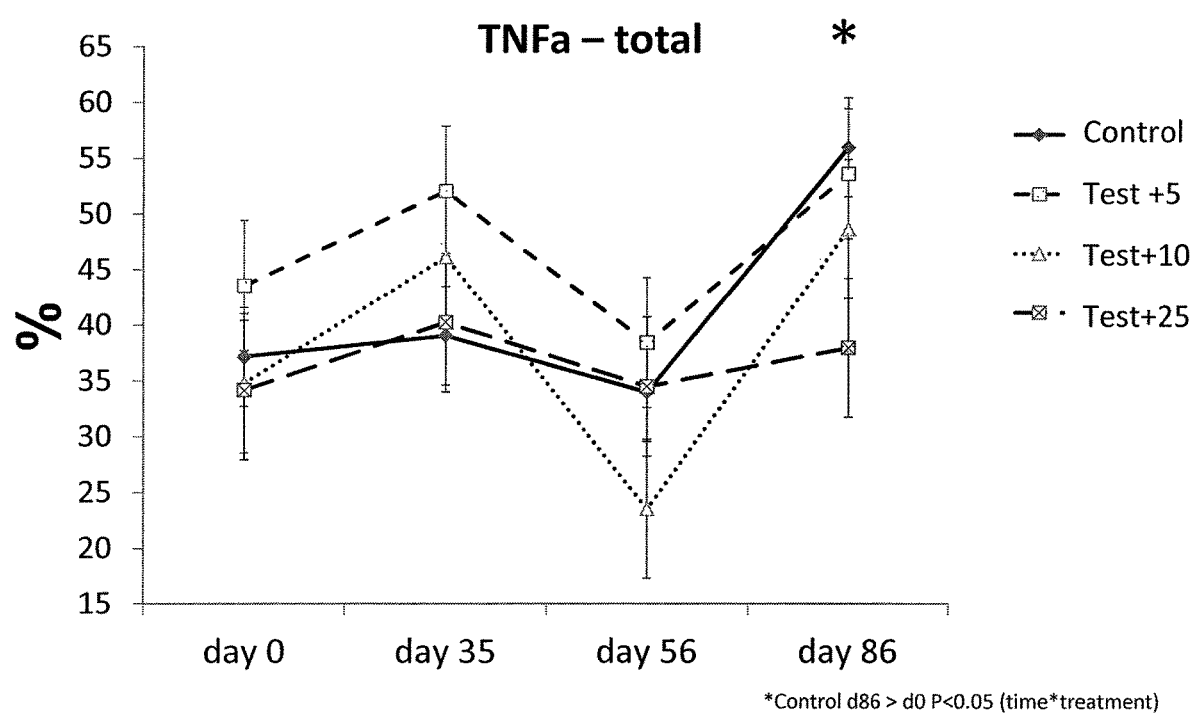
FIGS. 7 and 8 are graphs illustrating the average level of TNF-α in the control and test groups over the course of Study 2.
Figure 8:
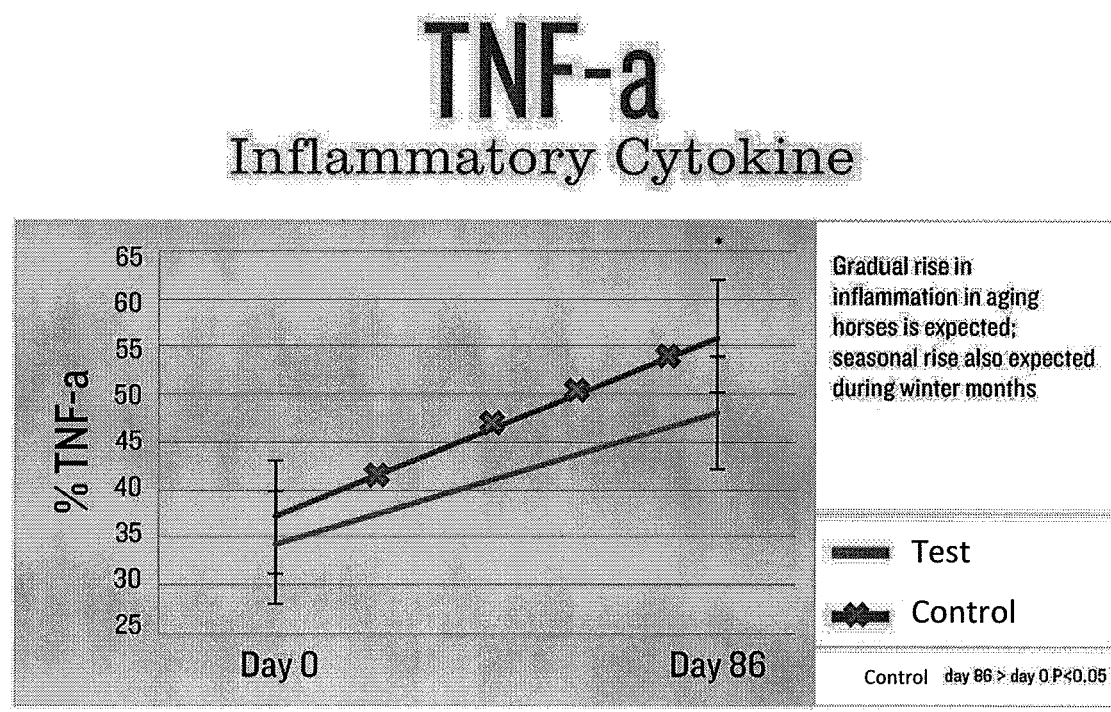
Figure 9:
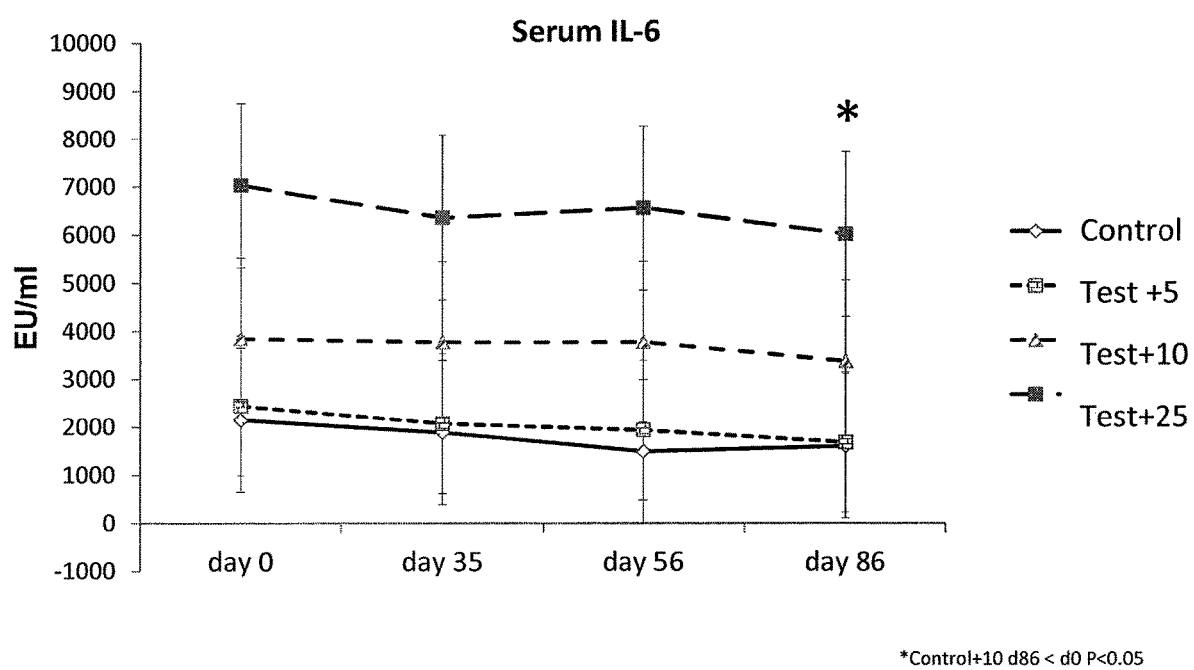
FIG. 9 is a graph illustrating the average level of Serum IL-6 in the control and test groups over the course of Study 2.
Figure 10:
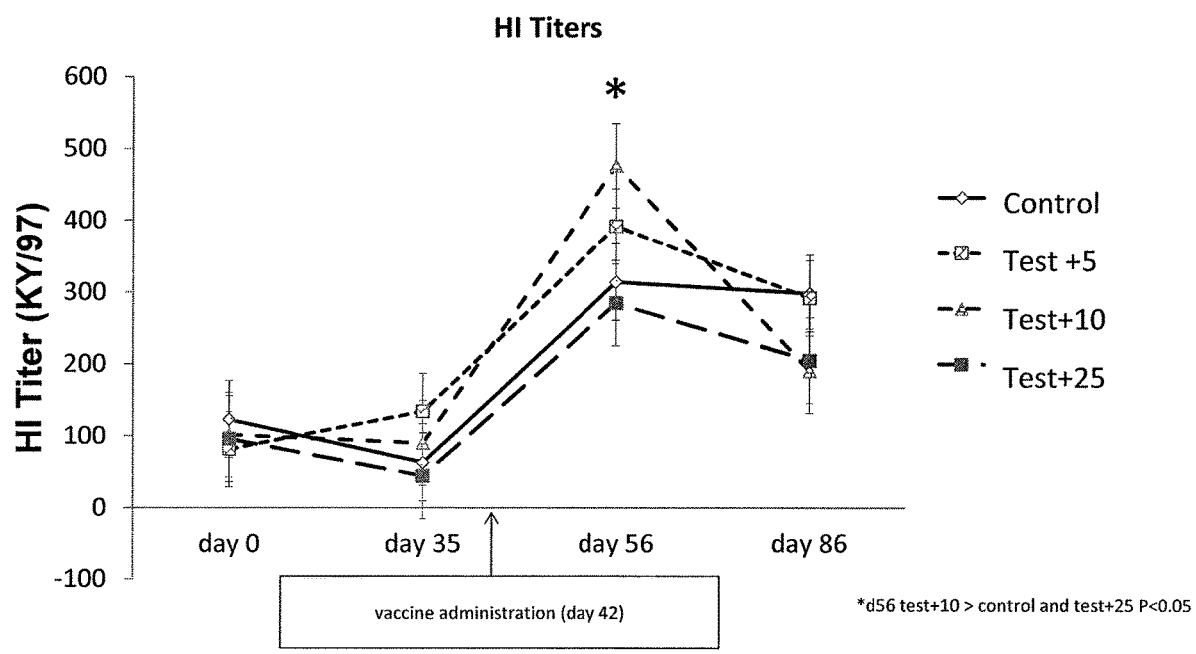
FIG. 10 is a graph illustrating the average level of Hemagglutination inhibition (HI) titers in the control and test groups over the course of Study 2.

Results:

All horses slightly lost weight but increased in BCS over time (FIG. 4). This is because the horses were overweight at the beginning of Study 2. A seasonal rise in inflammatory cytokine levels is expected during the winter months (when this study took place), but levels of the key inflammatory cytokines IFN-g (FIGS. 5 and 6) and TNF-α (FIGS. 7 and 8) increased in the control group but did not change in test rations 1, 2 and 3 (P<0.05). IL-6 decreased only in test group 2 over time (P<0.05) (FIG. 9). Flu titers were higher in test group 2 than the control and test group 3 at day 56 (P<0.05; FIG. 10), and the increase in flu titer was greatest in test group 1 (P<0.05) at 7300 EU/ml, with test group 2 at about 5000 EU/ml, test group 3 at 2500 EU/ml and the control at 800 EU/ml (ELISA). There were no effects of diet on KLH-specific vaccination response. Of note is that a gradual rise in inflammation in aging horses is expected; seasonal rise also expected during winter months.

Summary of Study 1 and Study 2:

The results of these two studies showed that feeding the animal feed containing the yeast fermentation product improved the response to influenza vaccination and reduced and/or protected against the rise in inflammatory cytokines (TNF-α, IL-6, and IFN-γ) associated with the aging process thereby mitigating an inflammatory response in the horse. Based on these results, equine animal feeds containing yeast fermentation products may improve performance of the equine animal by increasing the animal's lifetime through protecting against the negative effects of aging on immune response. The yeast fermentation product may be effective at each of the 5, 10, 25 and 40 gram per head per day inclusion rates in the feed, and accordingly at ranges of about 3 to about 50 grams per head per day. In some instances, a higher fat content feed may be combined with the yeast fermentation product depending on the animal's activity level.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations should not be construed as limiting.

As used herein, the term "about" modifying, for example, the quantity of an component in a composition, concentration, volume, viscosity, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

Similarly, it should be appreciated that in the foregoing description of example embodiments, various features are sometimes grouped together in a single embodiment, figure, or description thereof for the purpose of streamlining the disclosure and aiding in the understanding of one or more of the various aspects. This methods of disclosure, however, are not to be interpreted as reflecting an intention that the claims require more features than are expressly recited in each claim. Rather, as the following claims reflect, inventive aspects lie in less than all features of a single foregoing disclosed embodiment, and each embodiment described herein may contain more than one inventive feature.

While the present disclosure has been particularly shown and described with reference to embodiments thereof, it will be understood by those skilled in the art that various other changes in the form and details may be made without departing from the spirit and scope of the disclosure.

What is claimed is:

1. A method of decreasing production of at least one inflammatory cytokine in an aging adult equine animal, the method comprising:
   obtaining an animal feed combined with a *Saccharomyces cerevisiae* fermentation product, the animal feed comprising one or more of wheat products, soy products, alfalfa products, corn products or rice products, and the *Saccharomyces cerevisiae* fermentation product comprising a nutrient profile of about 0.1 to 1.0 percent fat, about 20 to 30 percent protein, about 0.5 to 2.0 percent fiber, and about 10 to 30 percent ash by weight of the product; and
   feeding the animal feed combined with the *Saccharomyces cerevisiae* fermentation product to the aging adult equine animal,
   wherein ingestion of the animal feed and the *Saccharomyces cerevisiae* fermentation product results in the decrease in the production of the at least one inflammatory cytokine selected from tumor necrosis factor-alpha (TNF-α), interferon-gamma (IFN-γ), and interleukin-6 (IL-6).

2. The method of claim 1, wherein the step of feeding the animal feed further comprises feeding forage to the equine animal.

3. The method of claim 2, wherein the forage is fed ad libitum.

4. The method of claim 2, wherein the forage is incorporated into the animal feed.

5. A method of protecting against a rise in at least one inflammatory cytokine in an aging adult equine animal, the method comprising:
   formulating a feed ration for the aging adult equine animal, the feed ration comprising a grain- and forage-based feed and a *Saccharomyces cerevisiae* fermentation product produced from a fermented molasses-based broth, and
   feeding the feed ration to the aging adult equine animal,
   wherein the grain- and forage-based feed comprises an animal a formula feed, wheat products, soy products, alfalfa products, corn products or rice products,
   wherein the *Saccharomyces cerevisiae* fermentation product comprises a nutrient profile of about 0.1 to 1.0 percent fat, about 20 to 30 percent protein, about 0.5 to 2.0 percent fiber, and about 10 to 30 percent ash by weight of the product,
   wherein the *Saccharomyces cerevisiae* fermentation product is present in the feed ration from about 5 grams to about 40 grams per head per day, and
   wherein ingestion of the feed ration results in the protection against the rise in the at least one inflammatory cytokine selected from tumor necrosis factor-alpha (TNF-α), interferon-gamma (IFN-γ), and interleukin-6 (IL-6).

6. The method of claim 5, wherein the feed ration further comprises forage, wherein the forage comprises one or more of hay or other roughage source.

7. The method of claim 5, wherein the grain- and forage-based feed is present in the feed ration at a level of at least about 3 pounds per head per day.

8. The method of claim 5, wherein the feed ration includes about 5 to about 10 percent fat by weight.

9. The method of claim 5, wherein the feed ration is formulated for a mature horse.

10. A method of increasing antibody titers in an aging adult equine animal given an equine influenza vaccine, the method comprising:
    combining into an animal feed a grain, a forage and a *Saccharomyces cerevisiae* fermentation product, and
    feeding the combined animal feed to the aging adult equine animal such that the animal ingests from about 5 grams to about 10 grams of the *Saccharomyces cerevisiae* fermentation product per head per day,
    wherein the *Saccharomyces cerevisiae* fermentation product is a dried product produced during fermentation of unmodified *Saccharomyces cerevisiae* and includes the products of fermentation, residual yeast cells and yeast cell fragments, and the media utilized during fermentation,
    wherein the *Saccharomyces cerevisiae* fermentation product comprises a nutrient profile of about 0.1 to 1.0 percent fat, about 20 to 30 percent protein, about 0.5 to 2.0 percent fiber, and about 10 to 30 percent ash by weight of the product,
    wherein the *Saccharomyces cerevisiae* fermentation product is present in the animal feed from about 0.1 to 1.0 percent by weight of the feed, and
    wherein ingestion of the combined animal feed results in a greater increase in hemagglutination-inhibition antibody titers compared to adult equine animals fed the same feed without the *Saccharomyces cerevisiae* fermentation product.

11. The method of claim 10, wherein the animal feed further comprises a grain product, dried beet pulp, oil, and a protein product.

12. The method of claim 10, wherein the feed ration includes about 5 to about 10 percent fat by weight.

13. The method of claim 10, wherein the feed ration contains about 8 to about 12 percent moisture by weight.

* * * * *

UNITED STATES PATENT AND TRADEMARK OFFICE
CERTIFICATE OF CORRECTION

Page 1 of 1

PATENT NO. : 10,939,691 B2
APPLICATION NO. : 14/512042
DATED : March 9, 2021
INVENTOR(S) : Kelly Vineyard It is certified that error appears in the above-identified patent and that said Letters Patent is hereby corrected as shown below:

In the Claims

At Column 18, Line 2, Claim 5, Line 11:
"wherein the grain- and forage-based feed comprises an animal a formula feed"
Should read:
--wherein the grain- and forage-based feed comprises an animal feed--

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*